United States Patent [19]

Bouchilloux et al.

[11] 3,754,375

[45] Aug. 28, 1973

[54] ANISOTROPIC ORGANOSILICON POLYMER MEMBRANE

[75] Inventors: Jean Bouchilloux, Bron; Albert Fabre, Lyon 3e; Alphonse Faure, Bron, all of France

[73] Assignee: Rhone-Poulenc S.A., Paris, France

[22] Filed: Mar. 2, 1971

[21] Appl. No.: 120,328

[30] Foreign Application Priority Data

Mar. 3, 1970 France .................................. 707570

[52] U.S. Cl. ...................... 55/16, 55/158, 260/2.5 S
[51] Int. Cl. ...................... B01d 53/22, C08c 17/08
[58] Field of Search ................ 55/16, 158; 161/206; 260/2.5 M, 2.5 S

[56] References Cited
UNITED STATES PATENTS 3,611,676   10/1971   Christen et al. ........................ 55/16
3,510,387   5/1970   Robb ..................................... 55/16
3,507,829   4/1970   Bostick ............................... 161/206

Primary Examiner—Charles N. Hart
Attorney—Stevens, Davis, Miller & Mosher

[57] ABSTRACT

An anisotropic membrane is provided having excellent mechanical properties combined with good permeation characteristics which comprises a vinyltriorganosilane polymer or copolymer consisting of a dense layer, of average thickness between 0.01 and 10 $\mu$, and a porous layer with open pores, of thickness up to 500 $\mu$ in which the volume of the interstitial spaces in the porous layer represents 20 to 80 percent of the total volume of the membrane.

13 Claims, No Drawings

ANISOTROPIC ORGANOSILICON POLYMER MEMBRANE

The present invention relates to an anisotropic membrane of a vinyltriorganosilane polymer, to a process for the preparation of this membrane, and to its application in gas permeation techniques.

According to the present invention, there is provided an anisotropic membrane which comprises a vinyltriorganosilane polymer or copolymer consisting of a dense layer, of average thickness between 0.01 and 10 $\mu$, and a porous layer with open pores, of thickness up to 500 $\mu$, with the volume of the pores (interstitial spaces in the porous layer) representing 20 to 80 percent of the total volume of the membrane.

A "dense layer", as used herein, is defined as a layer of polymer which displays substantially the same selectivity towards gases or vapours as does the polymer of which it consists. It is known that a given polymer, in the form of a film, displays gas permeability characteristics which vary depending on the gas in question. It is generally accepted that this selective permeability is due to the fact that the gases pass through the polymer film not only by travelling through pores in the film but also by permeation, that is to say by dissolving on one face, diffusing towards the other face, and desorbing at the other face (see for example Leibovits, Modern plastics, March 1966, page 139). The term "substantially the same selectivity as that of the polymer of which it consists", as used herein, means that the selectivity of the dense layer does not differ by more than 10 percent from that of a film of the polymer obtained by simple casting of a polymer solution and removal of the solvent.

"A porous layer with open pores" may be defined as a layer of polymer which displays no selective permeability whatsoever towards gases or vapours, which pass through the layer simply by travelling along the pores.

The thickness of the dense layer in the membranes of the invention is preferably between 0.05 and 5 $\mu$. The thickness of the dense layer may be determined by comparing the permeability of the anisotropic membrane with the permeability constants of the polymer of which it consists. In general, the permeability to oxygen is studied. Further details of the method of comparison are given in the Examples. The thickness of the porous layer does not significantly alter the permeation characteristics of the membrane but it does, above all, affect the mechanical properties of the membrane. This thickness is generally between 30 and 500 $\mu$, but membranes with a porous layer of between 80 and 250 $\mu$ thickness are preferably employed. The volume of the pores (or the volume of the interstitial spaces) is preferably between 35 and 70 percent of the total volume of the membrane (measured by taking the density of the membrane and comparing it with the density of a compact membrane).

The polymers used in the invention are vinyltriorganosilane polymers. By a "vinyltriorganosilane polymer" is generally meant a polymer comprising a plurality of units of formula:

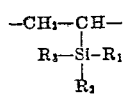
(I)

in which each of $R_1$, $R_2$ and $R_3$, which may be identical or different, represents an alkyl, cycloalkyl or aryl radical, and one of $R_1$, $R_2$ and $R_3$ may represent a hydrogen atom. Suitable examples of monomers which give rise to units of formula (I) include vinyltrimethylsilane, vinyltriethylsilane, vinyltripropylsilane, vinyltributylsilane, vinyldimethylethylsilane, vinyldimethylpropylsilane, vinyldiethylpropylsilane, vinyltricyclohexylsilane, vinyldimethylcyclohexylsilane and vinyldimethylphenylsilane. It is to be understood that the polymer can contain either solely units of formula (I), the various units being either all identical (for example polyvinyltrimethylsilane or polyvinyldimethylpropylsilane ) or different (for example copolymers of vinyltrimethylsilane andvinyldimethylpropylsilane), or units of formula (I) and units originating from other olefinic monomers (for example copolymers of vinyltriorganosilanes and styrene), the proportion of units of formula (I) being at least 75 percent by weight based on the weight of the copolymer.

The preparation of the vinyltriorganosilane polymers is known in the art. In particular, they can be prepared by employing catalysts based on a compound of a transition metal belonging to sub-groups IV to VI of the Periodic Table, and an organo-metallic compound of an element of groups I to III (see U.S. Pat. No. 3,223,686). However, it is preferred to use polymers prepared with the aid of catalysts based on lithium (as metal or as an organolithium compound), in accordance with the techniques described in USSR Pat. No. 162,531, or in Nametkin, Doklady Akadem. Nauk 166 (5) 1118 (1966).

The intrinsic viscosity of the polymers used in the membranes of this invention is generally above 50 cm$^3$/g, (measured at 25° in the cyclohexane) and it is preferably between 70 and 200 cm$^3$/g.

The membranes of the invention may be prepared by a process which comprises the following stages:

a. casting onto a support a solution of the polymer in a ternary mixture comprising two solvents for the polymer, having boiling points differing by at least 30°, and one non-solvent for the polymer, of boiling point higher than that of the more volatile solvent (hereafter referred to as the "light solvent") [The less volatile solvent will hereafter be referred to as the "heavy solvent".];

b. removing of all or part of the light solvent;

c. treating the resulting film with a coagulating (non-solvent) liquid; and d. drying the film.

The light and heavy solvents are suitably selected from aliphatic and aromatic hydrocarbons such as cyclohexane, benzene and toluene, and halogenated hydrocarbons, such as dichloromethane, dichloroethylene, tetrachloroethylene, chloroform, dichlorobenzene and monochlorobenzene.

Suitable non-solvents for the polymer include water, alcohols such as methanol, ethanol, and primary, secondary or tertiary butanol, and ketones, such as acetone, methyl ethyl ketone and cyclohexanone.

In the process of this invention, the nature and proportions of the solvents and of the non-solvent must be such that the polymer is soluble in the ternary mixture and insoluble (but possibly swellable) in the mixture of heavy solvent/non-solvent. In general, the weight of the light solvent represents 10 to 70 percent of the weight of the mixture of solvents.

Various procedures can be employed to prepare the polymer solution in the ternary mixture. In general, the polymer is in the solid form and can first be dissolved in one of the solvents, to which the other solvent, and finally the non-solvent, are then added. It is also possible to dissolve the polymer in the mixture of solvents and then to add the non-solvent; finally, the polymer can be dissolved directly in the ternary mixture. Other variants are also possible, such as diluting the non-solvent with a part of one of the solvents. Where the polymer is already in the form of a solution, it suffices to add, separately or as a mixture firstly a second solvent of boiling point differing by at least 30° from that of the first solvent, and secondly the non-solvent. The polymer may generally be dissolved at ambient temperature or with gentle heating and moderate stirring.

The choice of the support used for casting is not critical; the customary supports, such as a glass plate, for a discontinuous operation, or a metal belt, especially for continuous casting, can be used. The thickness of the layer deposited on the support can vary within wide limits, depending essentially on the apparatus used for casting. By using supports of various shapes, flat or tubular membranes can be obtained.

The proportion of light solvent removed in the next stage of the process affects the thickness of the dense layer. Thus, depending on the desired thickness of the dense layer, the whole, or only a part, of the light solvent should be removed. More generally, 25 to 100 % by weight of the light solvent is removed. It is desirable that during this removal of the light solvent, the temperature does not exceed the boiling point of this solvent.

The coagulant liquid is a liquid which is a non-solvent for the polymer but is miscible with the solvents and non-solvents quoted above, or with their mixtures. It is possible to use the same non-solvent as that used in the preparation of the casting solution, or to use a different non-solvent. The treatment with the coagulating liquid serves the purpose of setting (or gelling) the polymer solution or, in the case where the evaporation of the light solvent has already caused the start of the formation of the gel, of completing this formation. This treatment is continued until the solvents have been extracted to the maximum from the coagulated film. This treatment can be carried out discontinuously or continuously.

The final stage of the process consists of drying the film. This process can be carried out at ambient temperature or at a higher temperature, but preferably not exceeding 100°. The length of drying naturally depends on the nature of the coagulating liquid and on the solvents and non-solvents employed. Drying is usually continued until the liquids still present have been completely removed.

The membranes of this invention can also be reinforced with a screen, such as a woven fabric, for example a woven fabric of polyamide or of polyester, or a non-woven fabric of natural or synthetic fibres. The preparation of these membranes can be effected in accordance with the technique described above for membranes without screens, apart from the casting stage which is no longer carried out directly onto the support but onto the screen, the latter being applied previously to the support.

The membranes of this invention combine excellent mechanical properties with very high permeability and good selectivity towards gases and vapours. In view of their relatively high total thickness, these membranes are easy to handle and display good flexibility, which allows them to withstand, without deterioration, folding and mechanical stresses to which they may be subjected during use in permeation cells or pervaporation cells. The extremely low thickness of their dense layer gives them a very high permeability, which it has hitherto not been possible to achieve with organosilicon polymer membranes.

Owing to their properties, the membranes of the invention can advantageously be employed in various applications for which membranes which are selective towards gases or vapours are used. They are, in particular, suitable for enriching, in at least one gas, mixtures containing at least two gases chosen from oxygen, nitrogen hydrogen, carbon dioxide ($CO_2$), helium, methane and carbon monoxide. More particularly, they can be used for the enrichment of oxygen in air for various applications such as in blast furnace feed gases and in medical applications, for the isolation of helium from natural gas (mixtures of helium and methane), for the recovery of helium mixed with air in balloons (either exploratory balloons or dirigible balloons), for the separation of helium from its mixtures with oxygen and carbon dioxide (as in the gas mixtures breathed by divers or by the occupants of space cabins), for the separation of nitrogen from its mixtures with hydrogen (as in hydrogenation flushing gases), for hydrogen/methane separation in cracking gases, and for the purification of air contaminated with carbon monoxide.

The following Examples further illustrate the present invention.

EXAMPLE 1:

a. Preparation of polyvinyltrimethylsilane

Vinyltrimethylsilane was distilled at ambient temperature at $10^{-3}$mm/Hg; the distillate was collected in an ampoule, cooled by means of liquid nitrogen. After having introduced a catalyst solution into this ampoule, the ampoule was sealed and the polymerisation was allowed to proceed, initially at ambient temperature and then at 35°C.

The catalyst used was butyl-lithium, dissolved in cyclohexane. The amount of monomer used was 1400 g and the concentration of monomer in the reaction medium was 7 mols/litre. The concentration of catalyst in the reaction medium was $1.4 \times 10^{-3}$mol/litre.

The polymerisation lasted 435 hours; the polymer collected (1070 g) had an intrinsic viscosity of 148 cm³ g (at 25°, in cyclohexane).

b. Preparation of a membrane

Twenty g of the polymer described under a) were dissolved at 23°, with stirring, in a mixture comprising: 50 g of chlorobenzene and 58 g of dichloromethane.

When the material had completely dissolved, 32 g of isobutanol were introduced into the solution, whilst stirring. The solution thus obtained was cast onto a glass plate so as to yield a 500 $\mu$ thick layer.

The plate was left in air, at ambient temperature, for 7 minutes. During this period, about 45g of dichloromethane had evaporated. The formation of a skin on the free surface of the polymer layer was then observed. The film, still on its support, was then immersed in a bath of methanol at 23°. After 5 minutes the plate was withdrawn from the bath and left exposed to the air at 25°. After 2 hours, it was found that the membrane no longer contained solvent and/or non-solvent.

The membrane had a total thickness of 200 $\mu$. The volume of the interstitial spaces was about 52 percent relative to the total volume of the membrane. The permeability of the membrane thus prepared to the gases $O_2$, $N_2$, He, $H_2$ and $CH_4$ was then measured.

To determine this permeability, the membrane was clamped in a measuring cell; the membrane was supported by a sintered metal plate and the upstream side of this membrane was subjected to an excess pressure; on the downstream side the gas flow was measured by following the movement of a mercury marker in a calibrated capillary. The membrane used had a surface area of 12 cm². The permeability of the membrane to a given gas is the amount of gas (expressed in cubic centimetres under normal temperature and pressure conditions) which has passed through the said membrane, per square centimetre of surface area, per second, for a pressure drop of 1 cm of mercury between the upstream and downstream side of the membrane. The results obtained with the membrane were as follows:

Permeability to $H_2$ : $105 \times 10^{-6}$ cm³/cm².sec.cm Hg
$O_2$ : $17 \times 10^{-6}$
$N_2$ : $5.9 \times 10^{-6}$
He : $70 \times 10^{-6}$
$CH_4$ : $13.5 \times 10^{-6}$ Since the permeability to oxygen of a homogeneous polyvinyltrimethylsilane membrane of 1 cm thickness is $4.5 \times 10^{-9}$, one can deduce therefrom that the average thickness of the dense layer in the membrane described above was 2.6 $\mu$, since the permeability of a membrane is inversely proportional to its thickness. Such a permeability would correspond to that of an approximately 35 $\mu$ thick organopolysiloxane elastomer membrane of conventional type (as described, for example, in French Pat. No. 1,379,288), using its permeability to oxygen for reference purposes.

EXAMPLE 2

A membrane was prepared as in Example 1, but the time of evaporation of the light solvent (dichloromethane) was restricted to 1 minute. The amount of dichloromethane evaporated was about 30 g.

The thickness of the membrane was 170 $\mu$ and the volume of interstitial spaces represented 63 percent of the total volume of the membrane. The permeability of the membrane to oxygen was $172 \times 10^{-6}$ cm³/cm².sec.cm Hg. The permeability to nitrogen was $62 \times 10^{-6}$ cm³/cm². sec. cm Hg.

From its permeability to oxygen it can be deduced that the average thickness of the dense layer was 0.26 $\mu$. This permeability corresponds to that of a 3.5 $\mu$ thick organopolysiloxane elastomer membrane.

EXAMPLE 3:

a. Preparation of a copolymer of vinyltrimethylsilane and vinyldimethylpropylsilane The technique described in Example 1 was again adopted, using the following conditions:

Amount of monomers employed:
$(CH_3)_3$ Si CH = $CH_2$ = 135 g
$(CH_3)_2(CH_3CH_2CH_2)$Si CH = $CH_2$ = 15 g Concentration of the monomers in the reaction mixture:
$(CH_3)_3$ Si CH = $CH_2$ = 6.3 mols/l.
$(CH_3)_2(CH_3CH_2CH_2)$Si CH = $CH_2$ = 0.55 mol/l.
Catalyst concentration: $2.7 \times 10^{-3}$ mol/l.
Duration of polymerisation: 500 hours.

One hundred ten g of a copolymer having an intrinsic viscosity (measured as in Example 1) of 170 cm³/g were obtained b. Preparation of a membrane.

Twenty g of the polymer described under a) were dissolved in a mixture comprising 50 g of chlorobenzene and 58 g of dichloromethane. After solution, 32 g of isobutanol were added whilst stirring. The resulting solution was cast onto plate glass, to a thickness of about 500 $\mu$. It was left in air for 1 minute at 23° (during this period, about 28 g of dichloromethane had evaporated). The film and its support were then immersed for 5 minutes in a bath of methanol at 23°. The membrane was then dried, exposed to air at 23° for 2 hours. The total thickness of the membrane was 160 $\mu$ and the volume of interstitial spaces was about 61 percent.

A measurement of its permeability to various gases, carried out as described in Example 1, gave the following results:

Permeability:
$CO_2$ : $1005 \times 10^{-6}$ (cm³/cm².sec.cm Hg)
$O_2$ : $480 \times 10^{-6}$ (cm³/cm².sec.cm Hg)
$N_2$ : $150 \times 10^{-6}$ (cm³/cm².sec.cm Hg)
He : $1590 \times 10^{-6}$ (cm³/cm².sec.cm Hg)
$CH_4$ : $319 \times 10^{-6}$ (cm³/cm².sec.cm Hg).

From the permeability to oxygen of a homogeneous 1 cm thick membrane prepared from the same copolymer ($4.5 \times 10^{-9}$ cm³/cm².sec.cm Hg), the thickness of the dense layer of the membrane described above was calculated to be about 0.095 $\mu$.

The permeability to oxygen corresponds to that of an organopolysiloxane membrane about 1.25 $\mu$ thick.

EXAMPLE 4 a. A vinyltrimethylsilane homopolymer was parpared adopting the technique described in Example 1, except that the catalyst used was metallic lithium and it was introduced into the ampoule before the monomer. The working conditions were as follows:

amount of monomer used: 300 g
amount of catalyst : 0.12 g of a 9 percent strength by weight suspension of finely divided lithium in a solid hydrocarbon.

Monomer concentration in the reaction mixture: 7 mols/litre.

Catalyst concentration in the reaction mixture $3.5 \times 10^{-3}$ mols/litre.

Duration of polymerisation: 250 hours.

The polymer obtained (120 g) had an intrinsic viscosity of 150 cm³/g (at 25°, in cyclohexane).

b. 100 g of the polymer described under a were dissolved in a mixture comprising 300 g of dichloromethane and 250 g of chlorobenzene. After the polymer had dissolved, 160 g of isobutanol wer added, whilst stirring.

The solution was thereafter cast through a vertical die onto a collecting drum. The die was placed 0.35 mm above the drum. When the solution came into contact with the atmosphere, a dense layer formed on its surface. The speed of rotation of the drum was so adjusted that the dwell time of the solution in air at 23° was 73 seconds. The partially gelled film was carried, by the rotation of the drum, into a bath of methanol. The dwell in this bath was 10 minutes. The film thereafter passed over a succession of rollers at 30°, where it was completely dried.

The total thickness of the membrane was 190–210 $\mu$ and the volume of interstitial spaces represented 67 percent of the total volume of the membrane. This membrane had the following permeabilities to various gases:

$O_2$ : 21 × $10^{-6}$ $cm^3/cm^2$.sec.cm Hg
$N_2$ : 5.5 × $10^{-6}$ $cm^3/cm^2$.sec.cm Hg
$CH_4$ : 14 × $10^{-6}$ $cm^3/cm^2$.sec.cm Hg
$H_2$ : 105 × $10^{-6}$ $cm^3/cm^2$.sec.cm Hg
He : 73 × $10^{-6}$ $cm^3/cm^2$.sec.cm Hg
CO : 6.5 × $10^{-6}$ $cm^3/cm^2$.sec.cm Hg Based on the permeability to oxygen, the dense layer of this membrane was 2.1 $\mu$ thick.

EXAMPLE 5

Experiments on the enrichment of oxygen in air were carried out in a measuring cell as described in Example 1, but in which the membrane surface area was 500 $cm^2$. The membrane used was that obtained in Example 4.

The air introduced into the cell had the following composition: oxygen 21 percent (by volume) and nitrogen 78 percent. Circulation of air at a variable rate (escape rate) was established on the upstream side of the membrane. In Table I the results are shown of:

i. The pressure of air introduced into the apparatus, the rate of permeation of gas being 100 times less than the escape rate (so as to keep the composition of the upstream gas substantially constant) [Technique 1];

ii. the oxygen content of the gas which has permeated; and iii. the permeation rate of the gas (expressed in litres per hour for 500 $cm^2$ of membrane, measured at atmospheric pressure).

These processes took place at 23°.

Table II shows the results obtained with the same apparatus for an upstream pressure of 11 bars, with a variable escape rate [Technique 2]. In this case, the gas circulating on the upstream side of the membrane became depleted in oxygen.

TABLE II

| Air pressure (bars absolute) | Upstream gas Oxygen content | Escape rate (1/hr/500 $cm^2$) | Gas which has permeated Oxygen content | Rate, 1/hr/ 500 $cm^2$ |
|---|---|---|---|---|
| 11 | 21 | 600 | 44.5 | 13 |
| 11 | 20 | 300 | 43.5 | 13 |
| 11 | 18.5 | 120 | 42 | 13 |
| 11 | 16 | 60 | 40 | 13 |
| 11 | 12.5 | 30 | 37 | 13 |
| 11 | 9.8 | 15 | 33 | 12.6 |
| 11 | 5 | 5.4 | 28 | 11.3 |
| 11 | 3.5 | 3 | 26 | 10.4 |

EXAMPLE 6

The procedure of Example 5 (Technique 1) was followed with an upstream pressure of 6 bars (absolute pressure), and using temperatures of 25° and 60°C for the apparatus and the gas, respectively.

The following results were obtained:

Gas permeation rate:
at 25° : 5 l/hr/500 $cm^2$
at 60° : 10.5 l/hr/500 $cm^2$

Oxygen content of the gas which had permeated:
at 25° : 40%
at 60° : 39%

EXAMPLE 7

In order to obtain air which is heavily enriched in oxygen, the 500 $cm^2$ cell of Example 5 was used, coupled, at the outlet of the gas which had permeated, to a second 100 $cm^2$ cell.

Table III summarises the data and the results of three experiments. In these experiments, only the upstream pressure of the second cell was varied (by changing the escape rate from this cell).

TABLE III

| | Cell 1 | | | | Cell 2 | | |
|---|---|---|---|---|---|---|---|
| Upstream pressure (bars absolute) | Escape rate, 1/hr./500 $cm.^2$ | Rate of permeation, 1/hr./500 $cm.^2$ | Oxygen content, percent | Upstream pressure [1] | Escape rate, 1/hr./100 cm. | Rate of permeation, 1/hr./100 $cm.^2$ | Oxygen content, percent |
| 50 | 1,800 | 39 | 37 | 3 | 156 | 0.12 | 52 |
| 50 | 1,800 | 32.5 | 37 | 5.5 | 115 | 0.3 | 62 |
| 50 | 1,800 | 28 | 36 | 7.4 | 89 | 0.5 | 60 |

[1] The upstream pressure of cell 2 was equal to the downstream pressure of cell 1.

TABLE I

| Air pressure (bars absolute) | Gas which has permeated Oxygen content, % | Rate (1/hr/500 $cm^2$) |
|---|---|---|
| 5 | 38 | 5 |
| 7 | 41.5 | 8.80 |
| 9 | 43.5 | 12 |
| 11 | 45 | 15 |
| 21 | 45 | 30 |
| 31 | 45 | 42 |

EXAMPLE 8:

A cell of 500 $cm^2$ membrane surface area was used for enriching hydrogen in a hydrogen/nitrogen mixture. Table IV gives the results of 6 experiments during which certain parameters were varied. The temperature at which these experiments were conducted was −13°C.

TABLE IV

| Upstream gas | | Gas which has permeated | | | | | |
|---|---|---|---|---|---|---|---|
| | | Escaping gas | | | | | |
| Pressure (bars absolute) | Rate, 1/hr./500 $cm.^2$ | Hydrogen content, percent | Rate, 1/hr./500 $cm.^2$ | Percent $H_2$ | Pressure (bars) | Rate, 1/hr./500 $cm.^2$ | Hydrogen content, percent |
| 21 | 66 | 80 | 22 | 74.5 | 16 | 44 | 89.5 |
| 21 | 108 | 80 | 36 | 69.5 | 11 | 72 | 90.5 |
| 21 | 200 | 80 | 65 | 64 | 6 | 134 | 92.5 |
| 21 | 333 | 85 | 113 | 81 | 3 | 220 | 92.5 |
| 16 | 237 | 84.7 | 72 | 69.5 | 3 | 165 | 95.8 |
| 13 | 220 | 84.7 | 110 | 77.7 | 3 | 110 | 96.8 |

We claim:

1. An anisotropic membrane which comprises a vinyltriorganosilane polymer which comprises a plurality of units of formula:

in which each of $R_1$, $R_2$ and $R_3$, which may be identical or different, represents an alkyl, cycloalkyl or aryl radical, said polymer consisting of a dense layer, of average thickness between 0.01 and 10 $\mu$, and porous layer with open pores, of thickness up to 500 $\mu$, in which the volume of the interstitial spaces in the porous layer represents 20 to 80 percent of the total volume of the membrane.

2. A membrane according to claim 1 in which the thickness of the dense layer is between 0.05 and 5$\mu$.

3. A membrane according to claim 1 in which the thickness of the porous layer is between 80 and 250 $\mu$.

4. A membrane according to claim 1 in which each of $R_1$, $R_2$ and $R_3$, which may be identical or different, represents a methyl, ethyl, propyl, butyl, cyclohexyl or phenyl radical.

5. A membrane according to claim 1, in which all the units of formula (I) are identical.

6. A membrane according to claim 1, in which the units of formula (I) are of at least two types which differ in the nature of the radicals $R_1$, $R_2$ and/or $R_3$.

7. A membrane according to claim 1 in which the polymer is a copolymer of a vinyltriorganosilane and another olefinic monomer, the vinyltriorganosilane being present in an amount of at least 75 percent by weight.

8. A membrane according to claim 7 in which the olefinic monomer is styrene.

9. A membrane according to claim 1 in which the polymer has an intrinsic viscosity between 70 and 200 cm$^3$/g, measured in cyclohexane at 25°C.

10. A membrane according to claim 1 which is reinforced with a screen.

11. A membrane according to claim 10 which is reinforced with a woven polyamide or polyester fabric.

12. A method of enriching at least one component of a gas mixture comprising at least two of oxygen, nitrogen, hydrogen, carbon dioxide, helium, methane and carbon monoxide which comprises passing the gas mixture through an anisotropic membrane as defined in claim 7.

13. A method according to claim 12 in which the gas mixture is air or a hydrogen/nitrogen mixture.

* * * * *